(12) United States Patent
Malwitz

(10) Patent No.: US 6,840,528 B2
(45) Date of Patent: Jan. 11, 2005

(54) TWO WHEELER FRAME, IN PARTICULAR A BICYCLE FRAME

(75) Inventor: Ralf Malwitz, Münster (DE)

(73) Assignee: Derby Cycle Werke GmbH, Cloppenburg (DE)

( * ) Notice: Subject to any disclaimer, the term of this patent is extended or adjusted under 35 U.S.C. 154(b) by 0 days.

(21) Appl. No.: 10/410,615

(22) Filed: Apr. 9, 2003

(65) Prior Publication Data

US 2004/0108682 A1 Jun. 10, 2004

(30) Foreign Application Priority Data

Apr. 10, 2002 (DE) .................................. 202 05 539 U

(51) Int. Cl.⁷ .............................................. B62K 25/28
(52) U.S. Cl. ...................................................... 280/283
(58) Field of Search ................................ 280/283, 284, 280/285

(56) References Cited

U.S. PATENT DOCUMENTS

| | | | | |
|---|---|---|---|---|
| 4,087,109 A | * | 5/1978 | Davis .......................... | 280/284 |
| 4,327,930 A | * | 5/1982 | Tominaga et al. .......... | 280/284 |
| 4,421,337 A | * | 12/1983 | Pratt ........................... | 280/277 |
| 4,706,774 A | * | 11/1987 | Tsuboi ......................... | 180/227 |
| 4,765,432 A | * | 8/1988 | Odom ......................... | 180/227 |
| 5,306,036 A | * | 4/1994 | Busby .......................... | 280/284 |
| 5,335,929 A | | 8/1994 | Takagaki et al. | |

FOREIGN PATENT DOCUMENTS

| | | |
|---|---|---|
| DE | 296 18 383 U1 | 2/1998 |
| FR | 2 765 854 A1 | 1/1999 |

OTHER PUBLICATIONS

RadMarkt Bike Shop News Dec. 2000, p. 30.
RadMarkt Bike Shop News Nov. 2000, p. 36.

* cited by examiner

Primary Examiner—Kevin Hurley
(74) Attorney, Agent, or Firm—Collard & Roe, P.C.

(57) ABSTRACT

A two wheeler frame, in particular a bicycle frame including a first frame part having an upper tube and a second frame part having a mounting for a wheel of the two wheeler and which is pivotally linked to the first frame part, whereby the second frame part is resiliently supported against the first frame part via at least one spring element, in which the upper tube, at least in an area of its longitudinal extent, is divided into at least two sections enclosing a building space between them and in that the spring element is disposed in the building space between the sections.

10 Claims, 2 Drawing Sheets

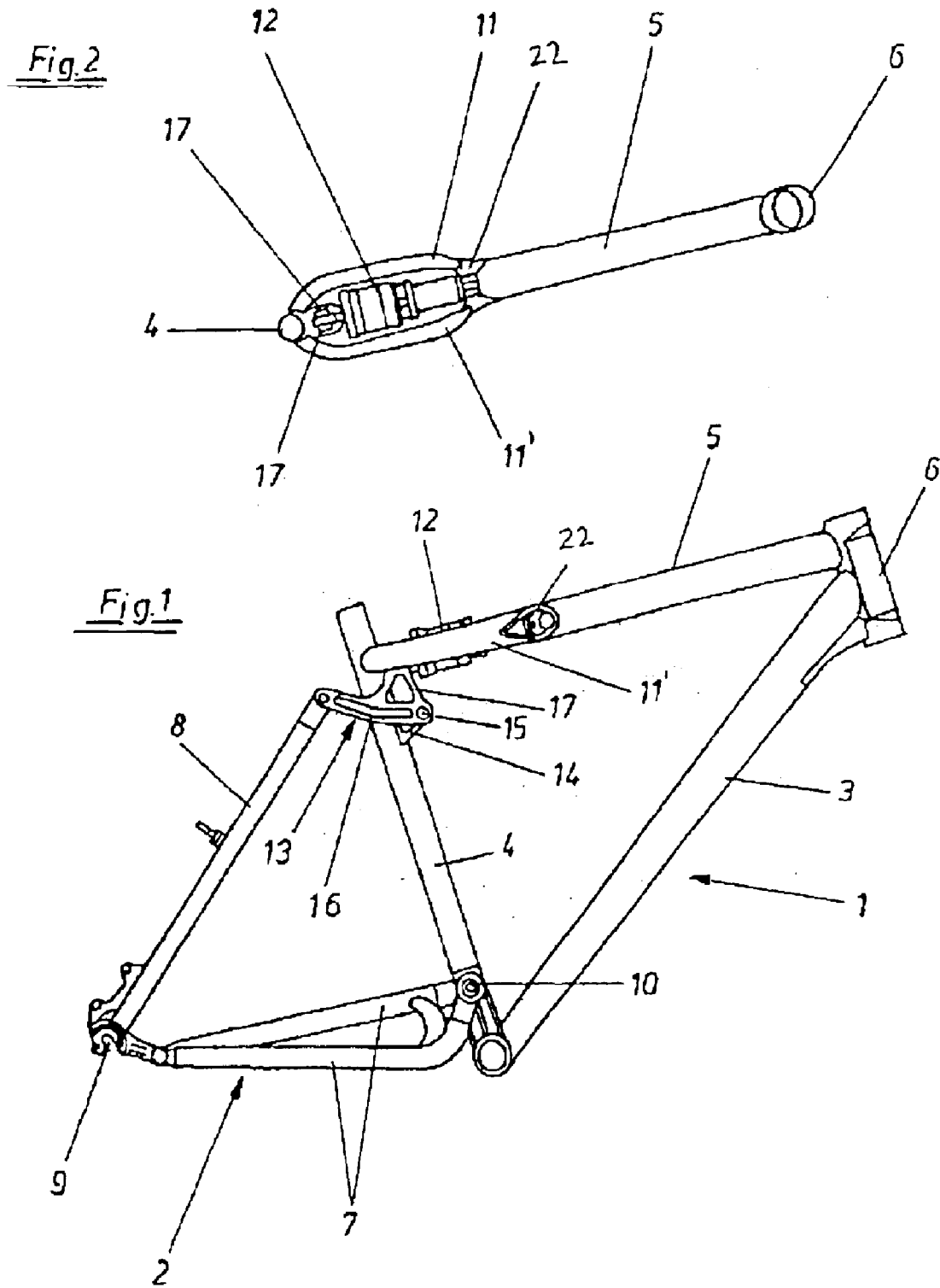

TWO WHEELER FRAME, IN PARTICULAR A BICYCLE FRAME

CROSS REFERENCE TO RELATED APPLICATIONS

Figure 3:
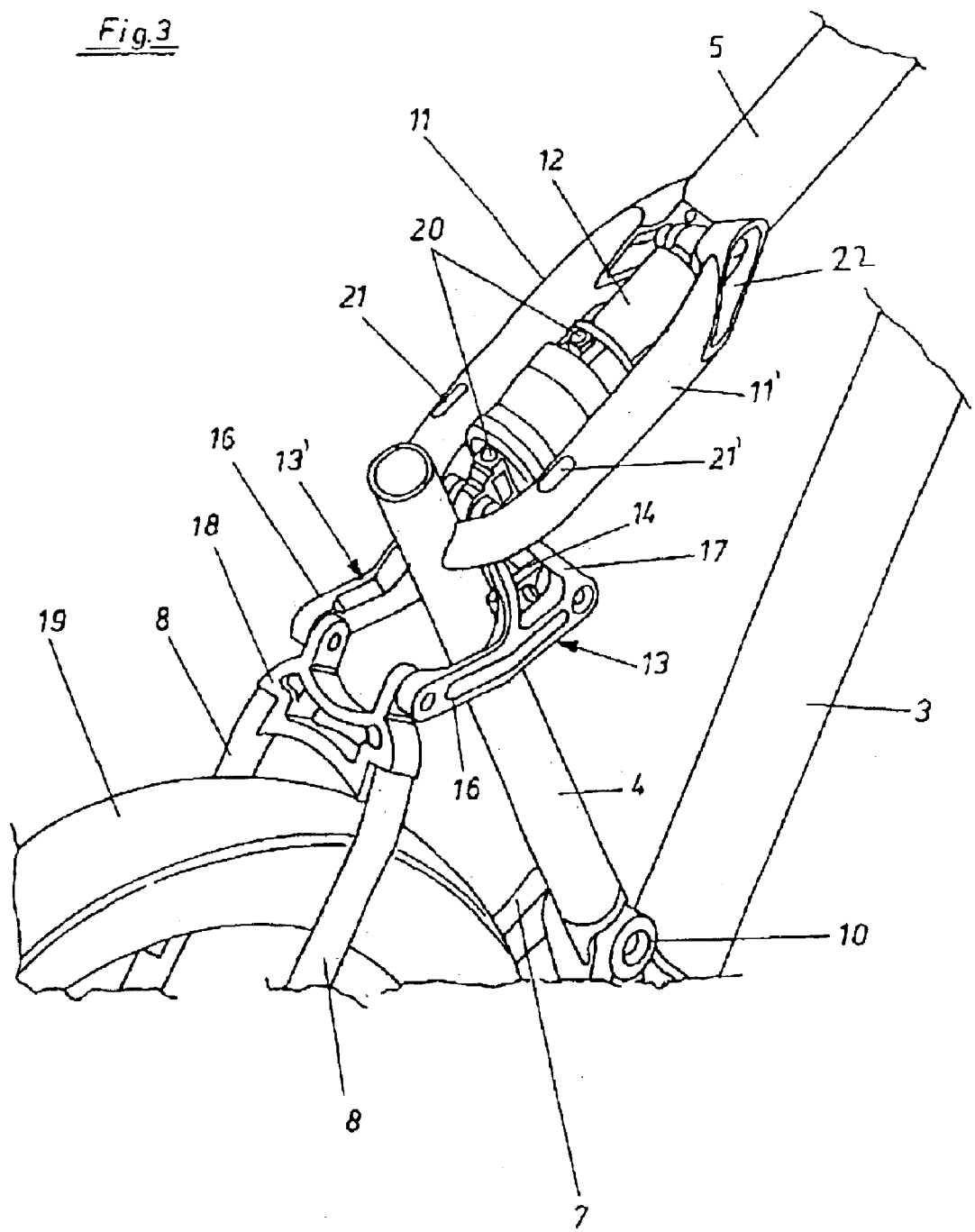

Applicant claims priority under 35 U.S.C. §119 of German Application No. 202 05 539.6 filed Apr. 10, 2002.

The invention relates to a two wheeler frame, in particular a bicycle frame, comprising a first frame part with an upper Lube and a second frame part having a mounting for a wheel of the twowheeler two wheeler and which is pivotally linked to the first frame part, whereby the second frame part is resiliently supported against the first frame part via at least one spring element.

A two wheeler frame, in particular a bicycle frame, servee to connect the essential parts of a two wheeler, in particular of a bicycle. Thus, the bicycle's wheels as well as further components such as saddle, handle bar and pedal bearings are regularly arranged on a bicycle frame.

In order to make riding a two wheeler, in particular a bicycle, more comfortable, sprung two wheelers have been proposed. Sprung bicycles have a bicycle frame which comprises at least one spring-mounted or one resiliently pivotally linked assembly. This assembly may, for example, be a second frame part which is pivotally linked to a first frame part and is supported against this first frame part via a spring element.

Rear wheels of bicycles in particular are mounted in this way. Thus a first frame part comprises an upper tube as well as a saddle tube and a bottom tube, while a second frame part is formed by stanchions carrying the rear wheel, such as chain stanchions and upper stanchions.

In order to resiliently support the second frame part against the first frame part spring elements are used, which are formed, for example, as cylinder-piston-arrangements. These spring elements are attached, with their free ends, to the first frame part and a second frame part in such a way that they form a springy and/or a dampening connection between these two frame parts pivotable or movable in relation to each other.

Frequently spring elements are arranged in the area of the pedal bearing of the bicycle. In this area, albeit, they fulfill their function to form a resilient support. However, they are arranged in a relatively low spot so that you have to bend down to reach them. It is important to reach a spring element for the reason that spring elements must be able to be regularly adjusted or locked. Spring elements may, for instance, be adjusted to produce varying degrees of hardness as regards their springiness, and also it is possible to completely eliminate their springiness by locking the spring element. This locking is necessary, in particular, when the bicycle is to be ridden in a rocking fashion, for with continued springiness a large part of the forces resulting from the rocking action is dissipated through the spring element.

Thus the low-down arrangement of the spring element is disadvantageous because the spring element is difficult to access. The rider has to dismount from the bicycle, crouch down on the ground and then make an adjustment.

The invention is based on the requirement to propose a two wheeler-frame of the kind mentioned in the beginning, which ensures a simple readily accessible position of the spring element.

According to the invention the requirement is met in that in at least one area of its longitudinal extent, the upper tube of the two wheeler frame is divided into at least two sections enclosing a building space between them and in that the spring element is disposed in the building space between the sections.

The two wheeler frame according to the invention has an upper tube which is disposed a relatively long way off the ground. It forms the top end of the bicycle frame, so that, in particular, it is freely accessible from above. According to the invention this upper tube is preferably spread open to form two sections in at least one area of its longitudinal extent with the two sections forming a building space between them. The building space is freely accessible.

According to the invention the spring element is disposed in the building space between the sections of the upper tube. Thus the spring element is positioned in the axis of the upper tube, so that, similar to the upper tube, it is easily accessible. A user sitting on the bicycle is able, during his ride, to reach the upper tube and thus also the spring element disposed in the building space between the sections of the upper tube, in particular in order to make adjustments to the spring element or to lock it. If the user of the bicycle intends to change into rocking mode, he can, just before doing so, lock the spring element during the ride, in order to ensure an optimal transfer of the forces generated by the rocking action to the ground through the bicycle.

Due to the disposition of the spring element in the axis of the upper tube a pleasing appearance is additionally achieved, since the spring element is substantially integrated into the upper tube. Moreover, dividing the upper tube into sections has the effect of increasing the rigidity of the upper tube. Also the building space in which the spring element is disposed between the sections is a location protected from contamination.

According to a first further development of the invention it is envisaged that each section of the upper tube is tubularly shaped. The sections of the upper tube are thus shaped as upper tube stanchions which are preferably arranged more or less parallel to each other. A space is thereby formed between the sections of the upper tube forming the building space for the disposition of the spring element. The space is dimensioned such that various commercially available spring elements different from each other can be disposed in the building space.

In a transitional area between the upper tube and the sections at least one connecting piece may be arranged. This connecting piece is preferably manufactured from the same material as the upper tube and is fixedly connected, for example via welded connections, with the upper tube and the sections. The spring element may also be linked to this connecting piece.

The next further development of the invention envisages that the second frame part has upper stanchions and chain stanchions, whereby the chain stanchions are pivotally linked to the first frame part and whereby the upper stanchions are linked to the spring element. The movability, in particular the pivotability of the second frame part relative to the first frame part has been achieved by linking the stanchions forming the second frame part in a constructive way. The stanchions carry the rear wheel and enable the rear wheel to be mounted resiliently on the bicycle relative to the first frame part. This type of mounting for a wheel is possible also for motorcycles of less than 50 $cm^3$ capacity, mopeds and other two wheelers.

The upper stanchions may be linked directly to the spring element. Particularly in the case where the first frame part has a saddle tube, a further development of the invention envisages that the upper stanchions are linked to the spring element via at least one intermediate component. The intermediate component guides the force past the saddle tube between upper stanchions and spring element. The construction is preferably such that the intermediate component is a lever pivotally attached to a first frame part to which the upper stanchions and the spring element are linked. By linking the upper stanchions and the spring element to this lever, the forces may be transferred in between these components through this lever. For this reason the lever may, for example, be pivotally attached to a saddle tube of the first frame part. It may be attached directly to the saddle tube, but preferably a projection is attached, for example welded, to the saddle tube, to which the lever is pivotally attached.

The end of the spring element facing the saddle tube is arranged in front of the saddle tube in riding direction of the bicycle. The upper stanchions, on the other hand, end behind the saddle tube seen in riding direction. In order to connect these components in a force-transferring manner while bypassing the saddle tube, a further development of the invention envisages that the lever is shaped somewhat like a "V", whereby it is somewhat pivotally attached, at the intersection of the shanks of the V, to the saddle tube or to the projection of the saddle tube and whereby the upper stanchions are pivotally linked to one shank and the spring element is pivotally linked to the other shank. The V-shaped lever is suitable for bypassing the saddle tube. For this reason it is pivotally linked, at the intersection of the shanks, to the saddle tube or to the projection of the saddle tube. Due to this linkage the shanks are pivotable about an axis extending through the intersection of the shanks. The axis may, for instance, extend through a bolt by which the lever is attached to the saddle tube or to the projection.

The upper stanchions and the spring element are linked to the pivotable shanks of the V. Forces from the upper stanchions can thus be transferred via the shanks to the spring element. The upper stanchions and the spring element are preferably linked to the free end of the shanks in order to profit from a largest possible lever path. At least one reinforcing stanchion preferably made in one piece may be attached to the shanks, which reinforcing stanchion connects the shanks with each other.

Preferably two intermediate components shaped as identical levers are provided which are aligned in parallel to each other and pivotally attached to the saddle tube. The shanks of these levers associated with the spring element may be pivotally connected with the spring element by means of a common bolt. The upper stanchions are linked to the other shanks.

The spring elements to be used on the two wheeler frame according to the invention may be of various types with and without damping. Preferably the spring element used is an oil-air-damper which has a maximum stop for its inward and outward spring deflection. The maximum stop defines the end positions of the pivotal range of the second frame part relative to the first frame part. The spring element with the maximum stop is disposed in the building space in such a way that the free end of the spring element facing the saddle tube does not come into contact with the saddle tube.

The intermediate components shaped as levers may be constructed in one piece or in several pieces and may be made of different materials, for example of aluminum, magnesium, steel or carbon.

One embodiment of the invention which results in further inventive features is shown in the drawing, in which FIG. 1 shows a side view of a two wheeler frame, FIG. 2 shows a top view of the upper tube of the two wheeler frame according to FIG. 1 and FIG. 3 shows a perspective partial view of the two wheeler frame according to FIG. 1.

The two wheeler frame in FIG. 1 is formed of a first frame part 1 and a second frame part 2 which is pivotally linked to the first frame part. The first frame part 1 comprises a bottom tube 3, a saddle tube 4, an upper tube 5 and a control head 6.

The second frame part 2 comprises chain stanchions 7 and upper stanchions 8 respectively arranged in pairs, which are connected with each other in the area of a dropout end 9. The chain stanchions 7 are pivotally linked to the saddle tube 4 in a pivot joint. Due to this linkage the second frame part 2 is pivotable about a pivot axis extending beyond the plane of the image.

FIG. 2 in particular shows that the upper tube 5 is divided into two sections 11, 11' in an area of its longitudinal extent. Each section 11, 11' is again shaped in the form of a tube. A building space is formed between the sections 11, 11' which are aligned in one plane parallel to each other. A spring element 12 is disposed in this building space. The connection between the upper tube 5 and the sections 11, 11' is effected by a profile-type connecting piece 22. At its free end the spring element 12 is linked to the connecting piece 22.

The second frame part 2 is connected with the spring element 12 via its upper stanchions 8 and via intermediate components in a force-transferring manner. The intermediate components may be levers 13, 13' (FIG. 3), which are pivotally attached to a projection 14 of the saddle tube 4.

They are attached via a bolt 15, through which the pivot axis extends. The levers 13, 13' are shaped somewhat like a V, whereby their linkage to the projection 14 is effected at the intersection of the shanks 16, 17 of the V.

The spring element 12 is linked to the free ends of the shanks 17 via a bolt. On the side opposite the shanks 17 the spring element 12 is again connected with the connecting piece 22 by means of a bolt. The other shanks 16 of the levers 13 extend past the saddle tube 4 and are connected at their free ends with the upper stanchions 8 via bolts.

FIG. 3 shows that the upper stanchions 8 are brought together by a connecting profile 18 ahead of the point where they are linked to the levers 13, 13'. A rear wheel 19 of a bicycle is illustrated between the upper stanchions 8.

FIG. 3 also shows that the spring element 12 has actuating elements 20 which are freely accessible from above. Longitudinal holes 21, 21' are arranged on the top of sections 11, 11', from which bunched components such as Bowden cables for brakes and control units can exit after being fed through the upper tube 5 and through the sections 11, 11'.

What is claimed is:

1. A two wheeler frame comprising:
    (a) a first frame part having an upper tube comprising at least two sections enclosing a building space between the sections;
    (b) a second frame part having a mounting for a wheel, said second frame part comprising a plurality of chain stanchions pivotally linked to said first frame part and a plurality of upper stanchions;
    (c) at least one spring element disposed in said building space resiliently supporting said second frame part against said first frame part; and (d) at least one intermediate component linking said upper stanchions to said at least one spring element;

wherein said at least one intermediate component comprises a lever pivotally attached to said first frame part and linked to said upper stanchions and said at least one spring element.

2. The two wheeler frame according to claim 1, wherein each section of the upper tube is tubularly shaped.

3. The two wheeler frame according to claim 1, further comprising at least one connecting piece disposed in a transitional area between the upper tube and the sections.

4. The two wheeler frame according to claim 1, wherein the lever is pivotally attached to a saddle tube of the first frame part.

5. The two wheeler frame according to claim 4, further comprising at least one projection attached to the saddle tube, to which the lever is pivotally attached.

6. The two wheeler frame according to claim 5, wherein the lever is shaped somewhat like a V, whereby it is pivotally linked, at the intersection of the shanks of the V, to the saddle tube or to the projection, and whereby the upper stanchions are pivotally linked to one shank and whereby the spring element is pivotally linked to the other shank.

7. The twowheeler two wheeler frame according to claim 4, wherein two intermediate components shaped as two identical levers are provided, which are aligned in parallel and pivotally attached to the saddle tube.

8. The two wheeler frame according to claim 1, wherein the spring element is an oil-air-damper having a maximum stop for its inward and outward spring deflection.

9. The two wheeler frame according to claim 1, wherein the lever is made of aluminum.

10. The two wheeler frame according to claim 1 wherein said frame is a bicycle frame.

\* \* \* \* \*